Oct. 14, 1941.                H. G. SWAN ET AL                2,259,049
                                  SIDE BEARING
                              Filed Sept. 8, 1939                 4 Sheets-Sheet 1

Inventors
HORACE G. SWAN
FREDERICK G. SUCKOW
By Ernest P. Mechlin
THEIR Attorney

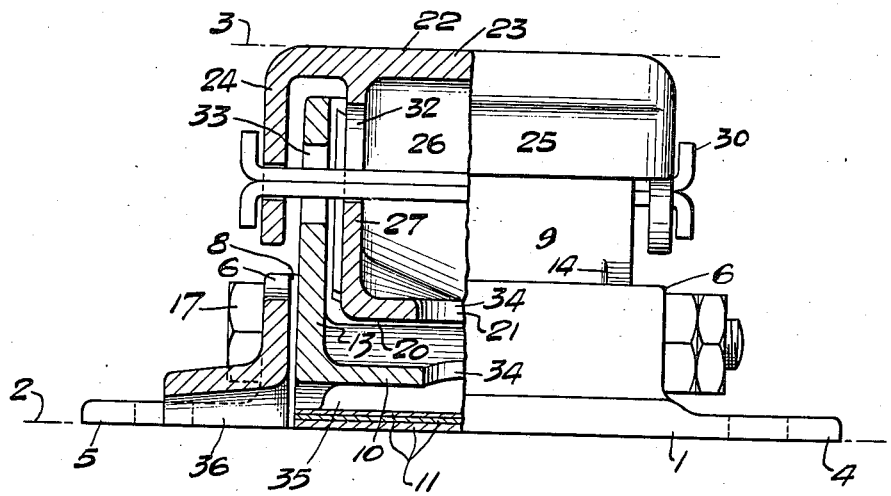
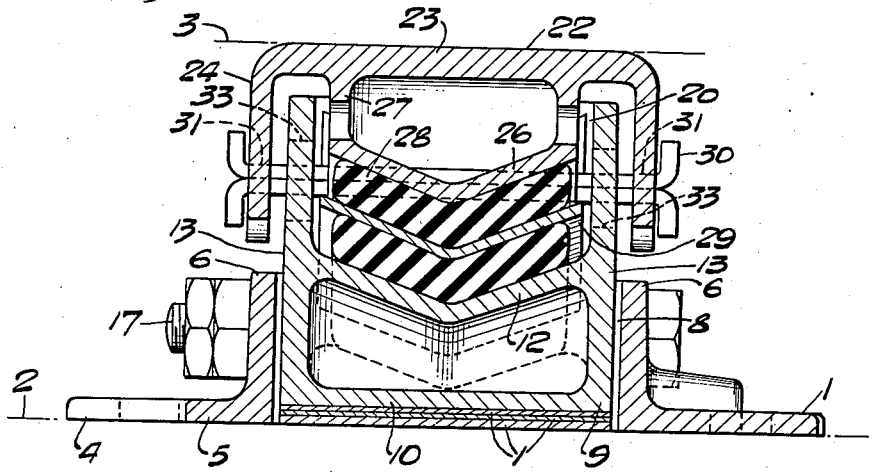

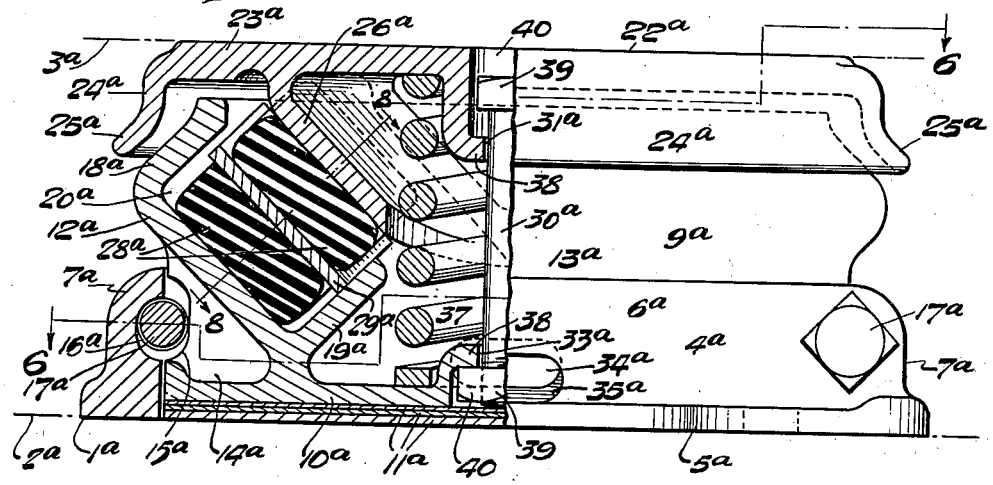
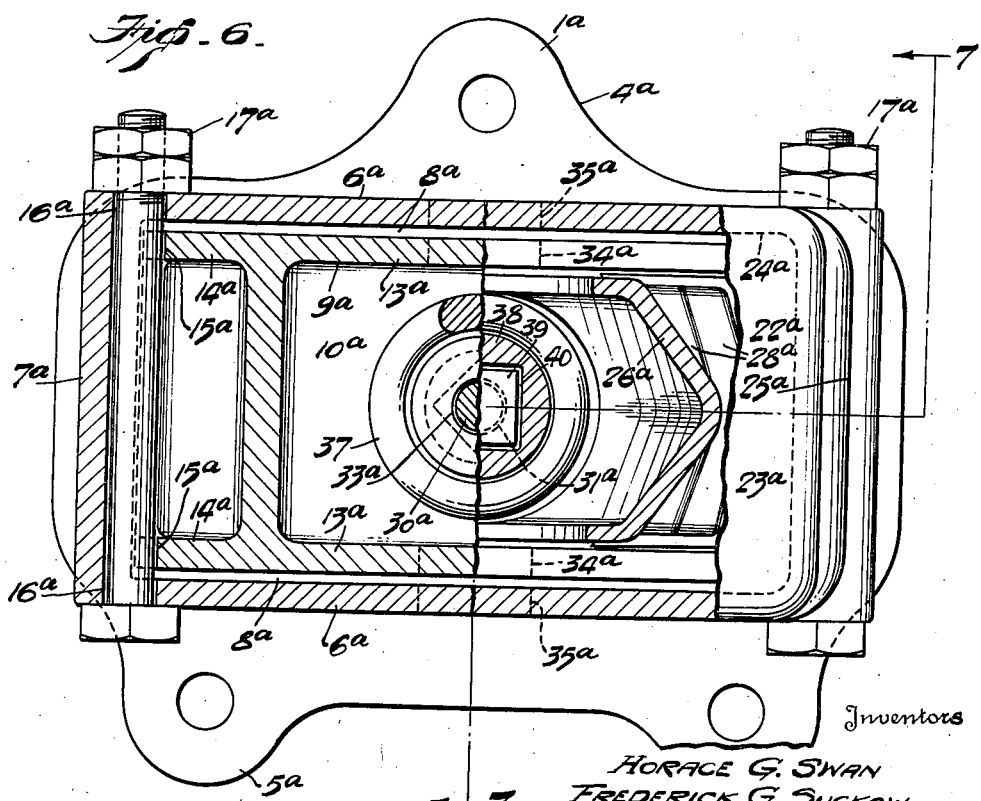

Oct. 14, 1941.　　　H. G. SWAN ET AL　　　2,259,049
SIDE BEARING
Filed Sept. 8, 1939　　　4 Sheets-Sheet 4

Inventors
HORACE G. SWAN
FREDERICK G. SUCKOW
By Ernest H. Mechlin
THEIR Attorney Patented Oct. 14, 1941

2,259,049

UNITED STATES PATENT OFFICE 2,259,049

SIDE BEARING

Horace G. Swan, East Aurora, and Frederick G. Suckow, Bowmansville, N. Y., assignors to The Symington - Gould Corporation, Rochester, N. Y., a corporation of Maryland Application September 8, 1939, Serial No. 294,016

20 Claims. (Cl. 308—138)

The invention relates to a side bearing of a resilient type employed in railway vehicles.

An object of the invention is to provide a side bearing of a resilient or compressible type and adapted to be interposed between a railway vehicle truck and body adjacent the transverse limits thereof to cushion the roll or rock of a car body.

Another object of the invention is to provide a side bearing adapted to be compressed a predetermined amount and, upon a full compressive movement thereof, to function as a non-resilient or solid side bearing to definitely limit the roll of a vehicle car body.

A further object of the invention is to provide a side bearing having particularly disposed walls with resilient material therebetween for resiliently resisting a downward and horizontal movement of a portion of the side bearing with respect to another portion thereof.

A still further object of the invention is to provide a side bearing having compressed resilient deformable members adapted to resiliently resist a compressive movement of the side bearing and means for maintaining the resilient members under a predetermined amount of compression as well as keeping the side bearing in assembled relation.

An additional object of the invention is the provision, in a side bearing, of resilient members of different characteristics to prevent a synchronous or harmonic action of the resilient members during service.

The above as well as numerous other objects will become apparent upon a review of the succeeding description considered in connection with the accompanying drawings which disclose exemplified forms of the invention and wherein:

Figure 3 is a partial vertical sectional and partial end elevational view taken along the lines 3—3 of Figure 2, looking in the direction of the arrows.

Figure 4 is a cross sectional view taken along the lines 4—4 of Figure 1, looking in the direction of the arrows.

Figure 5 is a partial vertical sectional and partial side elevational view of a side bearing embodying the present invention but of another form from the side bearing illustrated by Figures 1 to 4.

Figure 6 is a partial horizontal section and partial plan view taken along the lines 6—6 of Figure 5, looking in the direction of the arrows.

Figure 1:
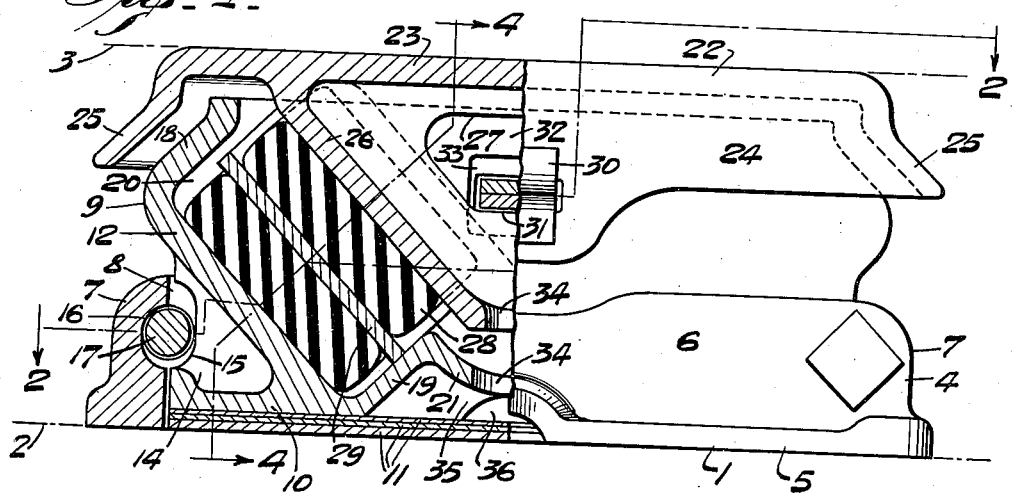
Figure 1 is a partial vertical sectional and partial side elevational view of a side bearing embodying the present invention.
Figure 2:
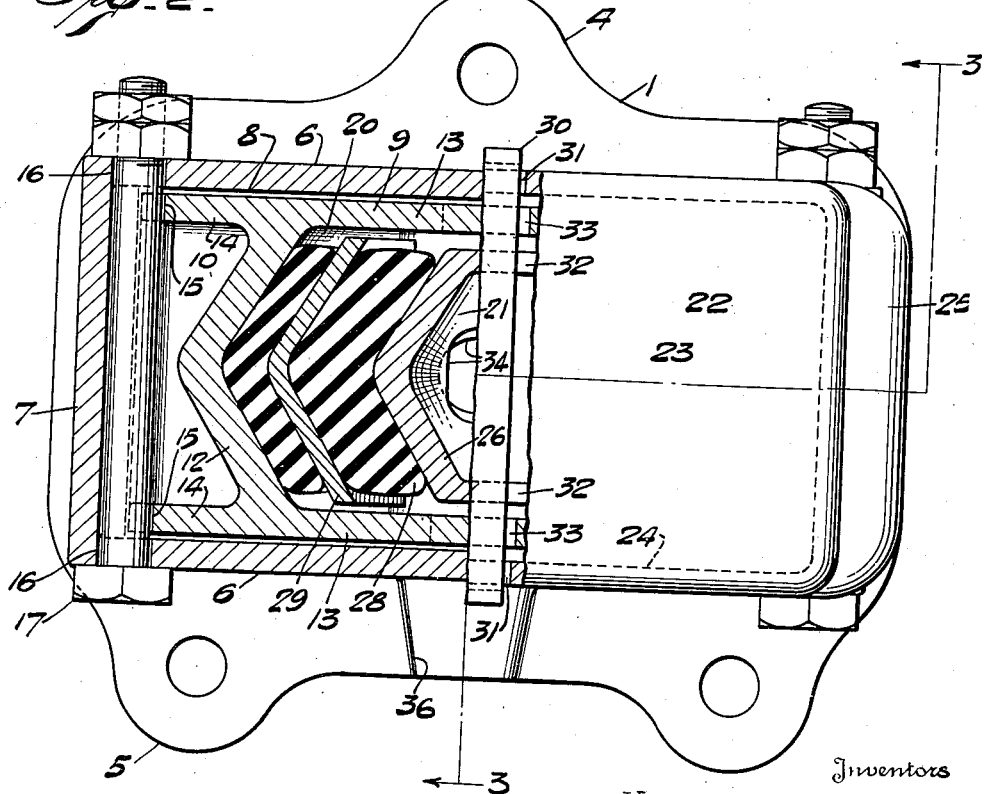
Figure 2 is a partial horizontal sectional view and partial plan view taken through different planes and along the lines 2—2 of Figure 1, looking in the direction of the arrows.
Figure 7:
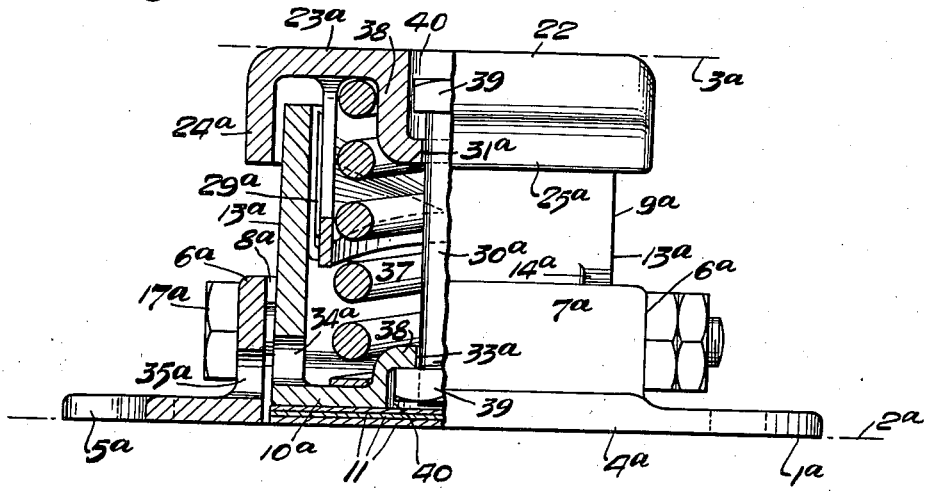
Figure 7 is a partial vertical and partial end elevational view taken along the lines 7—7 of Figure 6, looking in the direction of the arrows.

Referring now to the drawings in detail, wherein like reference characters indicate like parts, and initially considering the form of side bearing illustrated by Figures 1 to 4 thereof, the numeral 1 designates a side bearing of relatively few parts and adapted to cushion or resiliently resist the roll or rock of a railway vehicle body (not shown). As is understood, the side bearing is positioned adjacent the ends of and interposed between a truck and body bolster, only vertically spaced opposed surfaces 2 and 3, respectively, of which are diagrammatically indicated. The side bearing comprises a sleeve 4 having a body or lower plate 5 bearing upon the truck bolster surface 2 and being suitably apertured for the accommodation of rivets or any other desired type of attaching means for maintaining the sleeve in a fixed predetermined position. Upstanding from the sleeve lower plate are transversely spaced, longitudinally extending, substantially vertical side walls 6 joined integrally adjacent their longitudinal extremities by end walls 7 to form a relatively shallow receptacle having an aperture 8 extending entirely therethrough.

Removably associated with the sleeve is a casing or housing 9 positioned in and of a horizontal extent slightly less than the sleeve aperture 8. The housing is prevented from shifting horizontally by the sleeve and comprises a base plate 10 which may, if desired, bear upon shims or adjusting means 11 of any quantity and thickness so as to establish a fixed housing elevation. It may, at times, be found desirable to entirely eliminate the adjusting means as it will be understood that their presence is required only when the confronting bolster surfaces 2 and 3 are spaced apart a distance which, upon occupancy or application of a side bearing, would permit a compressive movement thereof in excess of or greater than that for which it was designed and intended. Since the distance between the bolster surfaces 2 and 3 may vary in assembled or associated bolsters due to manufacturing tolerances, the arrangement, for the application of the shims, facilitates a vertical adjustability of the housing and the preservation of a predetermined amount of compressive movement in the side bearing.

Diverging upwardly from the base plate is a plurality, preferably a pair, of spaced angularly disposed walls 12 substantially V- or chevron-shaped in cross section, as most clearly illustrated in Figure 4 of the drawings, and sloping or inclined from adjacent the transverse center line of the housing toward the longitudinal limits thereof. The inclined walls are joined integrally adjacent their transverse edges by means of spaced, substantially vertical side walls 13 which, in the area beneath the inclined walls, extend to the longitudinal limits of the housing to form gussets 14 for the vertical support of the inclined walls. Ordinarily no additional or extraneous means is required to retain the housing within the sleeve, but in order to prevent an accidental separation of the housing and sleeve, consideration being given primarily to the shipment of the side bearing as an individual unit, the gussets 14 are relieved or indented, as at 15, and the sleeve is provided with apertures 16 in transverse alignment with associated housing reliefs. Extending through the housing indentures and sleeve apertures are bolts 17 of commercial form which are carried by the sleeve. The housing indentures are elongated vertically or made greater in height than the diameters of the associated bolts in order that the housing may be adjusted vertically to suit the accommodating or occupied space between the confronting bolster surfaces.

Each angularly disposed wall 12 is provided with an upper and lower flange 18 and 19, respectively, which are directed upwardly and inwardly of the housing toward a transverse vertical plane thereof and form connecting means for the side walls. In substance, the upper and lower flanges, considered together with the portion of the side walls adjacent the angularly disposed walls, form a continuous peripheral flange outstanding from the inclined walls to define upwardly and inwardly facing pockets 20 for the purpose to be hereinafter explained. The housing lower flanges are joined by an intermediate arcuate web 21 which connects the side walls 13 to reinforce the housing against stresses to which it will be subjected in service.

Forming a component part of the side bearing is a cap or cover 22 movable relatively to the housing and being formed, in part, by a top or bearing plate 23 adapted to engage or bear against the downwardly facing body bolster surface 3. The bearing plate is normally, or when in service, spaced a desired distance above the housing, as clearly shown in Figures 1, 3 and 4 of the drawings; this distance being equal to the permissible or predetermined amount of compressive movement in the side bearing. The side bearing is of a horizontal extent in excess of the immediately underlying portion of the housing, and by reason of this construction and arrangement the side bearing, as illustrated, will function as a resilient or cushioning member until the bearing plate is urged downwardly to come into contact with the housing, at which time and upon the cap being subjected to additional forces tending to urge it downwardly, the side bearing will act as a non-resilient or solid member to positively and definitely arrest a continued approaching movement of the bolster surfaces 2 and 3 and thereby allow only a limited vertical movement between the bolster surfaces. Extending around the periphery of the bearing plate is a depending flange 24 spaced outwardly and overlapping the upper extremity of the housing to form a shield or guard by which dirt, water or other impurities are prevented from entering the interior of the side bearing. The portions of the peripheral flange adjacent the longitudinal extremities of the side bearing are flared outwardly, as at 25, to be disposed in spaced relation to the underlying housing upper flanges 18.

Projecting downwardly from the cap bearing plate to within the housing intermediate the side walls thereof is a plurality, preferably a pair, of sloping or inclined walls 26 which are substantially V- or chevron-shaped in cross section and terminate short of the housing connecting web 21 to allow an unrestricted compressive movement of the side bearing. The cap sloping walls are spaced from and preferably of the same inclination or disposition as the associated housing sloping walls; sufficient clearance being provided between the cap sloping walls and the adjacent upper and lower housing flanges to allow a free service movement of the cap without any interference therebetween. The cap sloping walls are connected adjacent their transverse extremities by means of reinforcing ribs 27 which are spaced inwardly of the housing from the side walls 13 a distance greater than a possible transverse movement of the cap with respect to the housing so that the reinforcing ribs will, at no time, engage the housing during a vertical movement of the cap to create frictional forces and a false side bearing capacity.

Various types of resilient means may be employed in the present construction and, as illustrative, a type which may be utilized to a distinct advantage comprises a plurality of pads 28 composed of a deformable material such as rubber or a rubber compound, the latter two of which are hereinafter used synonomously. In the instant structure the pads of each resilient means are secured by vulcanizing or any other approved manner to opposite sides of an intermediate or spacer plate 29 which has one or a lower extremity thereof in bearing relation with the associated lower flange 19 to maintain the resilient means in a predetermined position. The resilient means are positioned within and of an extent less than the housing pockets 20, and as the intermediate plate 29 forms a spacing means whereby the rubber pads are prevented from sliding downwardly and engaging the housing lower flange, space is formed about the resilient means within the pockets into which the deformable material is adapted to flow upon compression thereof. Each resilient means is, in cross section, reference being had to Figure 4 particularly, substantially V- or chevron-shaped or formed correspondingly to the engaging housing and cap sloping walls, and by reason of this formation any transverse movement of the cap with respect to the housing will also be resiliently resisted. It will, therefore, be noted that the resilient means are capable of cushioning a horizontal movement in any direction and a downward movement of the cap. Since a side bearing should be of a given capacity to absorb or cushion the shocks to which it will be subjected in service, means has been provided to maintain the resilient elements under a predetermined or an initial compression, and while various arrangements and instruments may be employed to the accomplishment of this purpose, there is disclosed, as illustrative, a tie or holding means 30 which is carried by and extends through substantially aligned apertures 31 in the cap peripheral flange and apertures 32 in the cap reinforcing ribs. The tie means also extends through apertures 33 in the housing side walls which are of a vertical and horizontal extent in excess to the cross sectional area of the tie means so that as the tie means moves with the cap, sufficient clearance is provided thereabout to allow a free unrestricted horizontal and vertical movement of the cap with respect to the housing and associated parts.

While the primary purpose of the cap peripheral flange is to arrest the entrance of foreign substance to within the side bearing it is quite possible, during service, for foreign substance to enter the space between the cap and housing or through the tie means apertures and thereby gain entrance to the interior of the side bearing. To provide a means of egress for any dirt or such like substance, the cap and housing are provided with vertically aligned orifices 34 which communicate with a conduit 35 formed in the lower extremity of the housing and an outlet 36 in the sleeve which is defined by a convolution in the sleeve lower plate 5 outwardly of one of the side walls 6.

Referring now to the form of invention illustrated by Figures 5 to 8, inclusive, the side bearing, designated generally by the reference character 1$^a$, is adapted to be interposed and function between opposing truck and body bolster surfaces 2$^a$ and 3$^a$, respectively. The side bearing comprises a sleeve 4$^a$ being formed by a lower plate 5$^a$ bearing upon and adapted to be secured to the truck bolster surface 2$^a$ in any approved manner. Adjacent the intermediate portion of the base plate are transversely spaced side walls 6$^a$ joined adjacent their extremities by end walls 7$^a$ to define an aperture 8$^a$ therebetween.

Movably associated with the sleeve is a housing or casing 9$^a$ positioned in the sleeve aperture and prevented from shifting horizontally by the sleeve walls. The housing comprises a horizontal base plate 10$^a$ beneath which is positioned shims 11$^a$ for maintaining the housing in a predetermined elevation and of a number and thickness sufficient to retain the established amount of compressive movement in the side bearing upon its association with the vehicle bolsters.

The housing base plate has spaced, oppositely sloping or inclined walls 12$^a$ of substantially V- or chevron-shape in cross section beginning intermediate the ends thereof and directed toward the longitudinal limits of the housing. Forming connections for the inclined walls are transversely spaced, substantially vertical side walls 13$^a$ which have portions thereof extending beneath the plane of the inclined walls to form reinforcing gussets 14$^a$ therefor. So as to ensure against an unwarranted or accidental displacement of the housing and associated structure, the gussets are provided with reliefs or indentures 15$^a$ and the sleeve has, in substantial transverse alignment with the reliefs 15$^a$, apertures 16$^a$. Bolts 17$^a$ of commercial form are disposed in the housing indentures and sleeve apertures, it being noted that the bolts are fixed with respect to the sleeve, and the housing indentures are elongated vertically so as to facilitate a vertical adjustability of the housing. The housing inclined walls are provided with upper and lower flanges 18$^a$ and 19$^a$, respectively, which are angularly disposed thereto and are directed inwardly and upwardly of the housing. The upper and lower flanges extend between and connect the housing side walls and, in effect, form therewith peripheral flanges outstanding from the housing sloping walls to define pockets 20$^a$ therebetween for the purpose to be hereinafter explained.

Forming a relatively movable part of the side bearing is a cover or cap, generally designated by the reference character 22$^a$ and being formed, in part, by a top or bearing plate 23$^a$, which, in service, is adapted to bear against the body bolster surface 3$^a$. Normally the bearing plate is spaced a desired distance above the housing, and by reason of this arrangement the cap may, in service, move downwardly toward the housing during a compressive movement of the side bearing; the range of movement being determinative of the compressive movement of the side bearing. The cap bearing plate is provided with a downwardly extending peripheral flange 24$^a$ positioned outwardly of and in overlapping relation with the upper extremity of the housing to form a means whereby foreign substance is excluded from the interior of the side bearing. The portions of the peripheral flange at the longitudinal extremities of the side bearing are flared outwardly thereof, as at 25$^a$, to prevent interference between the peripheral flange and the housing top flange during a compressive movement of the side bearing. It will be noted that the portion of the peripheral flange immediately adjacent the housing side walls is spaced a sufficient distance to allow a transverse movement of the cap with respect to the housing without a contact therebetween to build up a false capacity of the side bearing.

Extending downwardly from the cap bearing plate to within the housing are a number, preferably two, of sloping or inclined walls 26$^a$ which are substantially V- or chevron-shaped in cross section and spaced a desired distance from the housing sloping walls 12$^a$; sufficient clearance being provided between the cap sloping walls and the adjacent portion of the housing to allow a free unrestricted service movement of the cap. As in the previously described structure, resilient means are interposed between and react against the cap and housing sloping walls, being positioned within the housing pockets 20$^a$. The resilient means, which may be of various types, arrangements and constructions, are preferably formed of a multiplicity of pads 28$^a$ composed of a deformable material, such as rubber or a compound thereof. Each resilient means is made up of two pads vulcanized or otherwise secured to an intermediate plate 29$^a$, it being understood, of course, that the pads and plates, combined to form an individual resilient unit, may be of any number and that the disclosed units are merely illustrative and by no means intended to be interpreted as limitations. The intermediate plates 29$^a$ have the lower extremities thereof in bearing relation with the housing lower flanges 19$^a$ so that the rubber pads may be retained in a predetermined position in their respective pockets and held out of contact with the housing lower flanges 19$^a$. It will be noted that the rubber pads are spaced from the upper and lower flanges, and this space permits the rubber to flow upon the application of compressive forces thereto so as not to harness and defeat the successful operation of the rubber pads.

Figure 8:
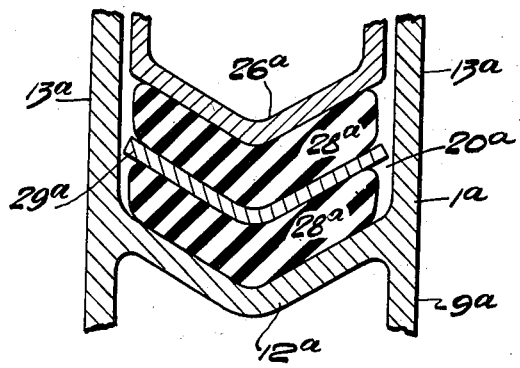
Figure 8 is a cross sectional view taken along the lines 8—8 of Figure 5, looking in the direction of the arrows.

As will be noted by referring particularly to Figure 8 of the drawings, each resilient means is substantially V- or chevron-shaped in cross section to correspond with the disposition of the engaging housing and cap walls. By forming the walls and resilient means as illustrated any transverse movement of the cap with respect to the housing will be resiliently resisted, and by inclining the housing and cap walls 12ª and 26ª, respectively, any downward or longitudinal movement of the cap with respect to the subjacent housing will be cushioned.

It may, at times, be found that the rubber formed resilient means will not return a cap of a compressed side bearing to its service or illustrated position as positively and quickly as may be required. For the accomplishment of this purpose, therefore, additional resilient means of a characteristic different from the rubber formed resilient means is arranged in such a manner as to react vertically against the housing and cap. Various types of this last-named resilient means may be employed, and, as illustrative, there is shown a coil or helical spring 37 positioned within the housing intermediate the lower flanges 19ª thereof and bearing against the housing base plate 10ª and the cap bearing plate 22ª. The coil spring, adding capacity to the side bearing and being of a characteristic different from the rubber formed resilient means, prevents a synchronous or harmonic action from being set up in the resilient elements of the side bearing during a compressive and expansive movement thereof. So as to prevent the coil spring from shifting horizontally and interfering with the successful operation of the side bearing there are provided centering nibs 38 directed inwardly of the side bearing and centrally of the helical spring from the housing base plate 10ª and cap bearing plate 22ª. In order to maintain a side bearing in assembled relation especially during shipment thereof as an individual unit as well as maintain all of the resilient means of the side bearing under a predetermined amount of initial compression, a tie means 30ª in the form of a commercial bolt extends through aligned apertures 31ª in the cap spring nib and 33ª in the housing spring nib. The bolt head and nut 39 are positioned in accommodating pockets 40 formed in the spring nibs.

While the primary purpose of the cap peripheral flange is to prevent the entrance of foreign substance to within the side bearing, it is quite possible, during service, for fine particles of dirt or water in the form of a spray to enter the space between the peripheral flange and the associated portion of the housing. To form an outlet, therefore, for permitting any foreign substance which may enter the interior of the side bearing to escape therefrom, aligned apertures 34ª and 35ª are positioned adjacent the lower extremities of the housing side walls and sleeve side walls, respectively.

As previously indicated, merely exemplified forms of the invention are illustrated and described and, as will be clearly understood, various changes and alterations may be made thereto without departing from within the spirit and scope of the appended claims.

We claim:

1. A side bearing, in combination, a housing having spaced inclined walls, peripheral means outstanding from each wall forming pockets, a cap having a bearing plate normally spaced above said housing, inclined walls depending from said bearing plate and being spaced from said peripheral means, and compressed rubber means positioned in said pockets and interposed between said housing and cap inclined walls for resiliently resisting a downward and longitudinal movement of said cap with respect to said housing.

2. In a side bearing, in combination, a sleeve, a housing positioned in and prevented from shifting by said sleeve, adjusting means underlying said housing, a pair of walls in said housing inclined away from one another, a cap having a bearing plate normally spaced above said housing, depending walls sloping toward one another and formed integrally with said cap, and compressed deformable material interposed between said housing and cap walls for resiliently resisting a downward and longitudinal movement of said cap with respect to said housing.

3. In a side bearing, in combination, a housing having a pair of sloping walls substantially V-shape in cross section, a cap having a bearing plate normally spaced above said housing, said bearing plate having depending sloping walls substantially V-shape in cross section and spaced from said housing walls, and compressed deformable means interposed between said housing and cap walls for resiliently resisting a downward and horizontal movement of said cap with respect to said housing.

4. In a side bearing, in combination, a housing having spaced inclined walls, a cap having a bearing plate normally spaced above said housing, spaced inclined walls depending from said bearing plate and being spaced from said housing walls, and compressed rubber means positioned between all of said walls for resiliently resisting a longitudinal movement of said cap with respect to said housing.

5. In a side bearing, in combination, a housing having spaced inclined walls, a cap having a bearing plate normally spaced above said housing, spaced inclined walls depending from said bearing plate and being spaced from said housing walls, compressed rubber means positioned between all of said walls for resiliently resisting a longitudinal movement of said cap with respect to said housing, and resilient means of different character reacting against said cap and housing.

6. In a side bearing, in combination, a housing having spaced inclined walls, a flange outstanding from each wall adjacent an extremity thereof, a cap having a bearing plate normally spaced above said housing, spaced inclined walls depending from said bearing plate and being spaced from said housing walls, compressed rubber means positioned between all of said walls for resiliently resisting a downward and longitudinal movement of said cap with respect to said housing, and means associated with said rubber means and engaging said flanges for maintaining said rubber means in a predetermined position.

7. In a side bearing, in combination, a housing having spaced inclined walls substantially V-shape in cross section, a cap having a bearing plate normally spaced above said housing, spaced inclined walls depending from said bearing plate and being spaced from said housing walls, said cap walls being substantially V-shape in cross section, compressed rubber means reacting against all of said walls for resiliently resisting a downward and horizontal movement of said cap with respect to said housing, and means associated with said cap and housing for maintaining said side bearing in assembled relation and said rubber means under compression.

8. In a side bearing, in combination, a housing having longitudinally spaced inclined walls, side walls joining said inclined walls, a bottom flange upstanding from each of said inclined walls, a cap having a bearing plate normally spaced above said housing, inclined walls depending from said bearing plate and positioned intermediate said housing side walls, resilient means reacting against said housing and cap inclined walls for resisting a downward and longitudinal movement of said cap with respect to said housing, and means associated with said resilient means and bottom flanges for maintaining said resilient means in a predetermined position.

9. In a side bearing housing, in combination, longitudinally spaced inclined walls, side walls joining said inclined walls, and a bottom flange upstanding from each of said inclined walls and connecting said side walls.

10. In a side bearing cap, in combination, a bearing plate adapted to engage a bolster, a peripheral flange outstanding from said bearing plate, and spaced inclined walls extending from said bearing plate for engagement with associated resilient means to cushion a vertical and longitudinal movement of said cap.

11. In a side bearing, in combination, a shallow sleeve, a housing positioned within and prevented from shifting by said sleeve, adjusting means within said sleeve and underlying said housing, spaced inclined walls on said housing, a cap having a bearing plate normally spaced above said housing, a peripheral flange on said cap overlapping an upper extremity of said housing, spaced inclined walls on and spaced inwardly of said cap from said peripheral flange, compressed deformable resilient means interposed between all of said inclined walls for cushioning a longitudinal and downward movement of said cap with respect to said housing, and means associated with said housing and resilient means for maintaining the latter in a predetermined position.

12. In a side bearing, in combination, a shallow sleeve, a housing positioned within and prevented from horizontal shifting by said sleeve, spaced inclined walls on said housing, a cap having a bearing plate normally spaced above said housing, a peripheral flange on said cap overlapping an upper extremity of said housing outwardly thereof, spaced inclined walls on said cap extending into said housing, compressed deformable resilient means interposed between all of said inclined walls for cushioning a longitudinal and downward movement of said cap with respect to said housing, resilient means of different character reacting against said cap and housing, and tie means for maintaining said side bearing in assembled relation.

13. In a side bearing, in combination, a housing having inclined walls chevron-shaped in cross section, a cap having inclined walls chevron-shaped in cross section and spaced from said housing inclined walls, and resilient material correspondingly formed and interposed between said housing and cap walls for cushioning a downward and horizontal movement of said cap with respect to said housing.

14. In a side bearing, in combination, a housing having inclined walls chevron-shaped in cross section, a cap having inclined walls chevron-shaped in cross section and spaced from said housing inclined walls, compressed rubber means correspondingly formed and interposed between said housing and cap walls for cushioning a downward or horizontal movement of said cap with respect to said housing, and means associated with said rubber means for maintaining it in a predetermined position.

15. In a side bearing, in combination, a sleeve, a housing positioned in and prevented from shifting by said sleeve, adjusting means underlying said housing, a plurality of walls in said housing angularly disposed to one another, a cap having a bearing plate normally spaced above said housing, a plurality of walls angularly disposed to one another and formed integrally with said cap, and resilient means interposed between said housing and cap walls for resiliently resisting a downward movement of said cap with respect to said housing.

16. In a side bearing, in combination, a housing member having spaced walls, a cap member having a bearing plate normally spaced above said housing, spaced walls depending from said bearing plate and being spaced from said housing member walls, the walls of one of said members being substantially V-shape in cross section, spring means interposed between said housing member and cap member walls for resiliently resisting a downward movement of said cap member with respect to said housing member, and means associated with said members for maintaining said side bearing in assembled relation and said spring means under compression.

17. In an integral side bearing housing, in combination, longitudinally spaced upstanding inclined walls, and side walls joining said inclined walls, said inclined walls being V-shaped in horizontal cross section.

18. In a side bearing, in combination, a sleeve, a housing positioned in and prevented from shifting by said sleeve, adjusting means underlying said housing, a plurality of walls in said housing angularly disposed to one another, a cap having a bearing plate normally spaced above said housing, a plurality of walls angularly disposed to one another and formed integrally with said cap, resilient means interposed between said housing and cap walls for resiliently resisting a downward movement of said cap with respect to said housing, and resilient means of different character from said first-named resilient means reacting against said cap and housing, all of said resilient means adapted to resist a downward movement of said cap with respect to said housing.

19. In a side bearing, in combination, a housing having inclined walls, a cap having a bearing plate normally spaced above said housing, inclined walls on said cap spaced from said housing inclined walls, and resilient means interposed between said housing and cap inclined walls, said resilient means comprising a plurality of rubber pads having plate means sandwiched therebetween.

20. In a side bearing, in combination, a housing having inclined walls, a cap having a bearing plate normally spaced above said housing, inclined walls on said cap spaced from said housing inclined walls, resilient means interposed between said housing and cap inclined walls, said resilient means comprising a plurality of rubber pads having plate means sandwiched therebetween, and a vertically acting coil spring interposed between said housing and cap.

HORACE G. SWAN.
FREDERICK G. SUCKOW.